(12) United States Patent  (10) Patent No.: US 9,228,530 B2
Kodama et al.  (45) Date of Patent: Jan. 5, 2016

(54) PISTON FOR INTERNAL COMBUSTION ENGINE

(71) Applicant: Hitachi Automotive Systems, Ltd, Hitachinaka-shi, Ibaraki (JP)

(72) Inventors: Youichi Kodama, Fussa (JP); Hiroaki Hamada, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/204,732

(22) Filed: Mar. 11, 2014

(65) Prior Publication Data

US 2014/0283766 A1  Sep. 25, 2014

(30) Foreign Application Priority Data

Mar. 21, 2013  (JP) .................................. 2013-058883

(51) Int. Cl.
*F01P 1/04* (2006.01)
*F02F 3/22* (2006.01)
*F16J 1/09* (2006.01)

(52) U.S. Cl.
CPC ..... *F02F 3/22* (2013.01); *F16J 1/09* (2013.01)

(58) Field of Classification Search
CPC ............... F02F 3/22; F02F 3/003; F02F 3/00; F02F 3/02; F02F 3/08; F16J 1/09
USPC ............ 123/193.6, 193.1, 41.1, 41.37, 41.35, 123/41.42, 41.16
See application file for complete search history.

(56) References Cited

U.S. PATENT DOCUMENTS

| | | | |
|---|---|---|---|
| 6,240,828 B1* | 6/2001 | Fujimoto | 92/214 |
| 6,499,386 B2* | 12/2002 | Martin et al. | 92/186 |
| 8,079,403 B2* | 12/2011 | Kollotzek | 164/369 |
| 2003/0188633 A1* | 10/2003 | Griffiths et al. | 92/208 |
| 2004/0055460 A1* | 3/2004 | Kohnert | 92/185 |
| 2007/0107215 A1* | 5/2007 | Scharp | 29/888.042 |
| 2009/0025550 A1* | 1/2009 | Benz et al. | 92/186 |
| 2009/0261232 A1* | 10/2009 | Kollotzek | 249/175 |
| 2011/0114054 A1* | 5/2011 | Miller et al. | 123/193.6 |
| 2013/0160733 A1* | 6/2013 | Bauer | 123/193.6 |

FOREIGN PATENT DOCUMENTS

JP  2009-221900 A  10/2009
JP  2009-281387 A  12/2009

* cited by examiner

*Primary Examiner* — Lindsay Low
*Assistant Examiner* — Long T Tran
(74) *Attorney, Agent, or Firm* — Crowell & Moring LLP

(57) ABSTRACT

A piston for an internal combustion engine comprises a crown, a skirt section extending from the crown, and an oil ring groove. The piston further comprises a drain hole and a cooling channel. The drain hole extends from the oil ring groove to an inside space of the piston. The cooling channel is formed in the crown at a level above the oil ring groove, and arranged to covey a cooling oil. The cooling channel includes a channel segment which is located near the drain hole and which is formed to have a sectional shape avoiding the drain hole.

20 Claims, 5 Drawing Sheets

PISTON FOR INTERNAL COMBUSTION ENGINE

BACKGROUND OF THE INVENTION

The present invention relates to a piston for an internal combustion engine and more specifically to a piston having therein a cooling channel formed in a piston crown and arranged to convey a cooling oil.

A patent document 1 (JP2009-221900A) and a patent document 2 (JP2009-281387A) show pistons for internal combustion engines of motor vehicles.

A piston disclosed in the patent document 1 includes an annular cooling channel formed in the piston crown and arranged to covey the cooling oil. The cooling oil injected from an oil jet provided in a lower portion of the cylinder bore is introduced into the cooling channel, and caused to flow in the piston crown to cool the piston crown and piston rings fit in three piston ring grooves formed in the outside circumferential surface of the piston crown.

A piston disclosed in the patent document 2 includes a plurality of drain holes formed in the piston crown so as to extend radially in the piston crown from an oil ring groove to the inside space of the piston and arranged to drain the oil scraped by a piston ring from the inside circumferential wall surface of the cylinder bore, from the piston groove to the inside space of the piston through the drain holes.

SUMMARY OF THE INVENTION

In the case in which a drain hole as disclosed in the patent document 2 is formed in a piston crown formed with a cooling channel as disclosed in the patent document 1, the drain hole is formed by drilling in a sloping direction of a relatively large inclination angle from the oil ring groove to the inside space of the piston to avoid the cooling channel.

However, the drilling operation to open the drain hole in the inclined direction is difficult and troublesome in positioning of the forward end of a drilling tool and setting of the inclination angle, so that the efficiency in the drilling operation is poor.

Therefore, it is an object of the present invention to provide a piston for an internal combustion engine to make easier a production process of the piston and specifically an operation of forming an oil drain hole.

According to one aspect of the invention, a piston for an internal combustion engine, comprises: a crown including a crown surface defining a combustion chamber; a skirt section extending from an outside circumference of the crown; an oil ring groove formed in an outside circumference of the crown; a drain hole extending through a bottom wall of the oil ring groove and connecting the oil ring groove with an inside space of the piston; and a cooling channel formed, in a shape of a circular ring, in the crown at a position between the crown surface and the oil ring groove, and arranged to covey a cooling oil. The cooling channel includes a channel segment which is located near the drain hole and which is formed to have a sectional shape avoiding the drain hole.

DETAILED DESCRIPTION OF THE INVENTION

Embodiments according to the present invention are explained hereinafter with reference to the drawings. In illustrated examples of these embodiments, a piston is for an internal combustion engine such as a four cylinder inline reciprocating gasoline engine.

Figure 1:
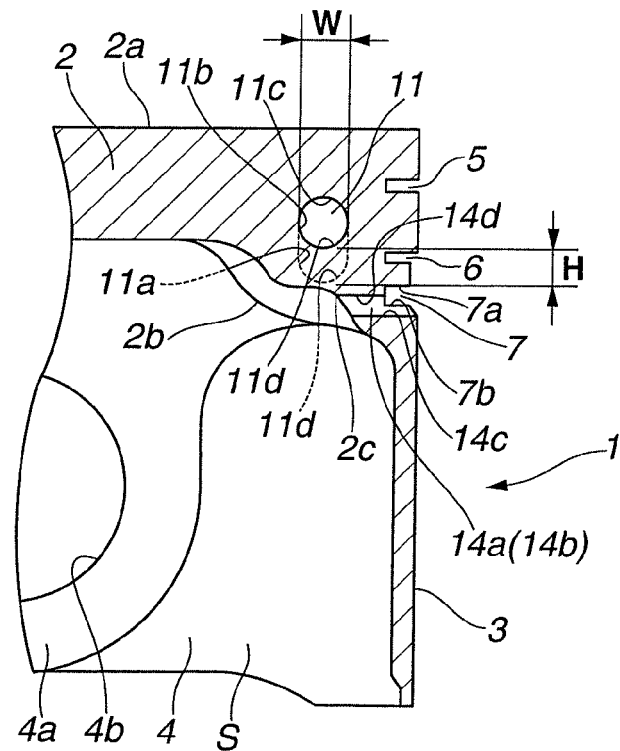
FIG. 1 is a sectional view of a main portion of a piston according to a first embodiment of the present invention.
Figure 2:
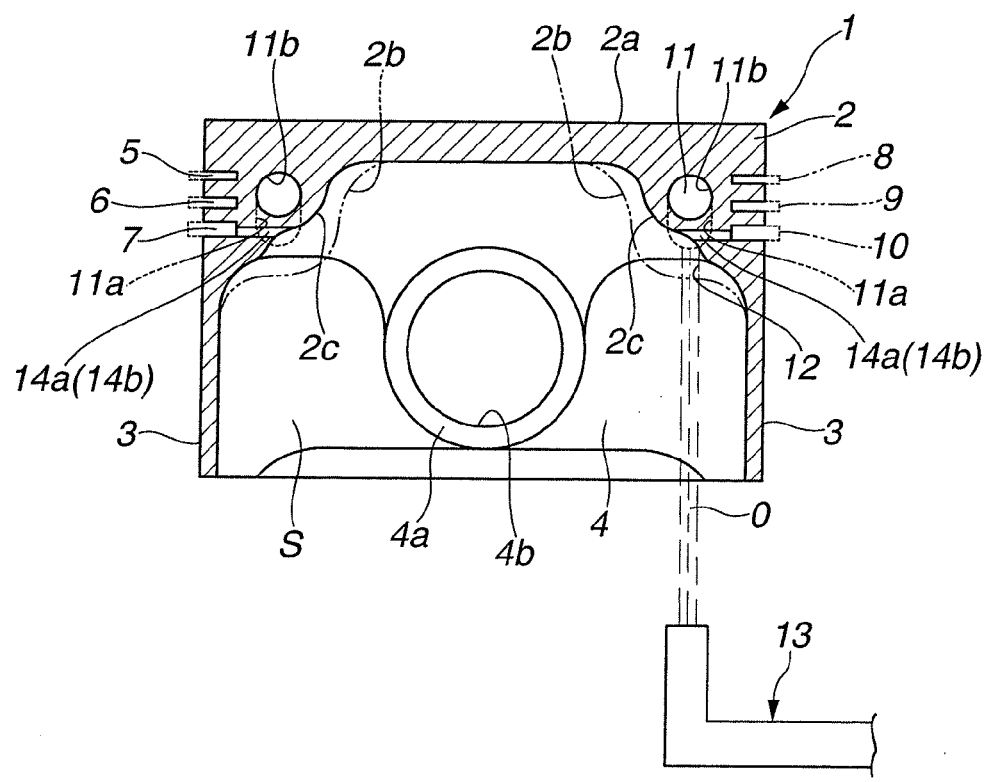
FIG. 2 is a vertical sectional view of the piston according to the first embodiment.
Figure 3:
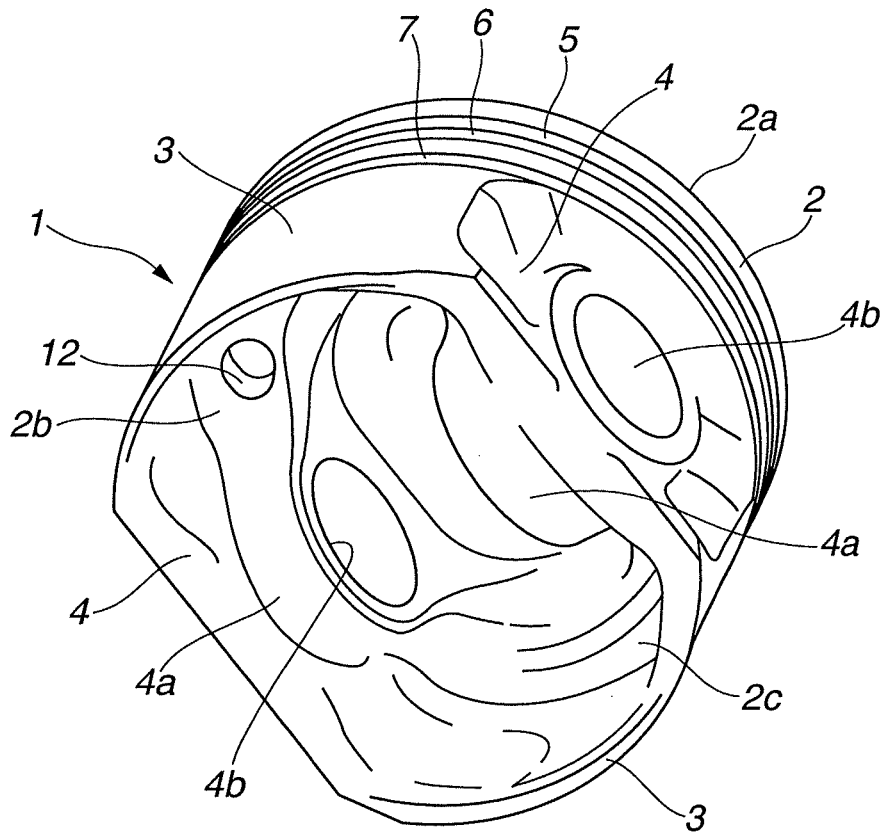
FIG. 3 is a perspective view of the piston according to the first embodiment, as viewed from below.

A piston 1 in an illustrated example according to a first embodiment of the present invention is an integral member in the form of a hollow cylinder closed at one end, formed by casting of aluminum alloy, as base material, such as AC8A Al—Si alloy. As shown in FIGS. 1~3, the piston 1 includes a crown or head 2, a pair of skirts 3, 3 (a skirt section), a pair of aprons 4, 4 and an inside space S. The piston crown 2 includes a crown surface 2a defining a combustion chamber of the engine. The skirts 3, 3 extends downwards as viewed in FIGS. 1 and 2, from a lower end of piston crown 2, respectively on a thrust side and an anti-thrust side, in the form of a circular arc. The aprons 4, 4 extend circumferentially between skirts 3 and connect skirts 3 so as to form a circumferential wall surrounding the inside space S of piston 1. The inside space S is defined by the piston crown 2 closing the top end of inside space S, and the piston skirts 3 and aprons 4 surrounding the inside space S.

Each of the piston aprons 4, 4 is formed integrally with a pin boss 4a including a pin hole 4b opened at the center of the pin boss 4a. The pin bosses 4a, 4a of aprons 4, 4 are designed to support both ends of a piston pin (not shown) to be inserted through pin holes 4b.

The piston crown 2 includes a relatively thick wall portion shaped like a circular disk. The crown surface 2a is formed with a recess (not shown) forming the combustion chamber and having a section shaped like an inverted M. The outside circumferential surface of piston crown 2 is formed with a plurality of piston ring grooves 5, 6 and 7, by machining operation such as cutting and polishing. In this example, the piston ring grooves 5 and 6 are pressure ring grooves for retaining pressure rings 8 and 9, respectively. The piston ring groove 7 is an oil ring groove for retaining an oil ring 10.

The piston crown 2 includes a thick wall portion 2b, a thin wall portion 2c, and a cooling channel 11 formed in the thick wall portion 2b and thin wall portion 2c. The cooling channel 11 is formed in piston crown 2, at a position surrounded by ring grooves 5~7, and arranged to cool the whole of the piston crown 2 with a cooling oil such as a lubricant circulating through the cooling channel 11. The thick wall portion 2b and thin wall portion 2c are inside portions surrounding by ring grooves 5~7. The thick wall portion 2b is formed by increasing a wall thickness, and the thin wall portion 2c is a portion formed by decreasing the wall thickness as compared to the thick wall portion 2b by removing the surface layer of the thick wall portion 2b.

Figure 5:
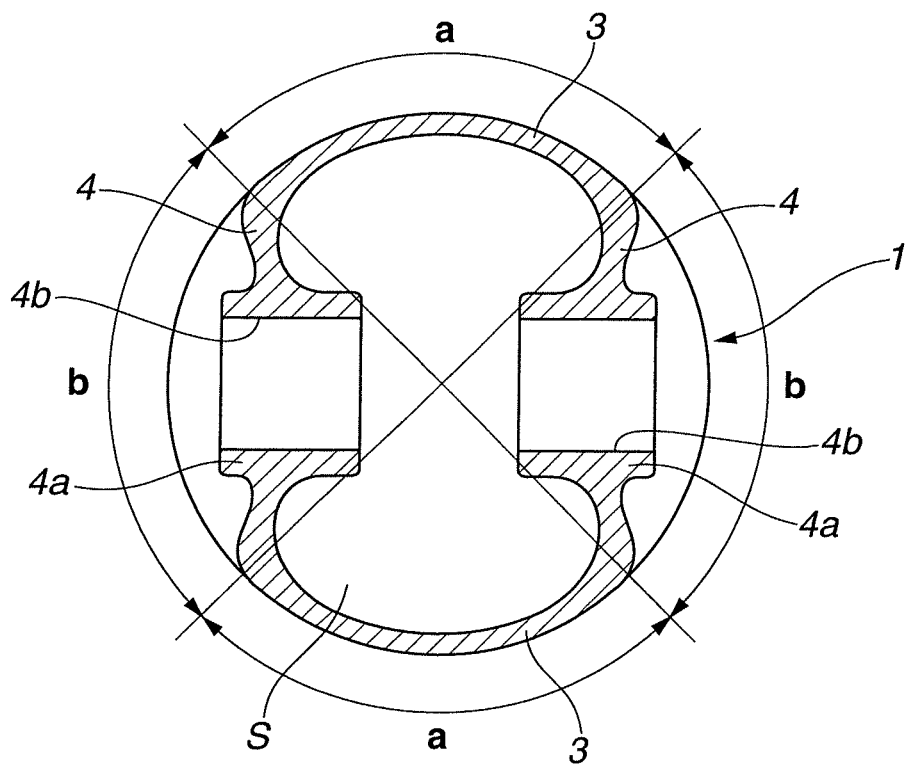
FIG. 5 is a cross sectional view of the piston according to the first embodiment.

The thick wall portion 2b is formed in each of regions or sectors "b" in which the aprons 4 are formed respectively, and the thin wall portion 2c is formed in each of regions or sectors "a" in which the skirts 3 are formed respectively, as shown in FIGS. 1,2 and 5. The two thick wall portions 2b, 2b and two thin wall portions 2c, 2c are arranged alternately around the piston axis or center line, and the wall surfaces of thick and thin wall portions 2b and 2c are connected continuously.

The cooling channel 11 is an annular fluid passage formed in the thick and thin wall portions 2b and 2c, as shown in FIGS. 1 and 2 and FIGS. 4 and 6. An oil introduction hole 12 is formed at a lower portion of one of the thick wall portions 2b. The cooling oil "O" ejected from an oil jet 13 is introduced through the oil introduction hole 12, into cooling channel 11. The cooling oil is circulated in cooling channel 11, and discharged downwards into the inside space S through a discharge hole (not shown) formed at a predetermined position in the circumferential direction.

Figure 6:
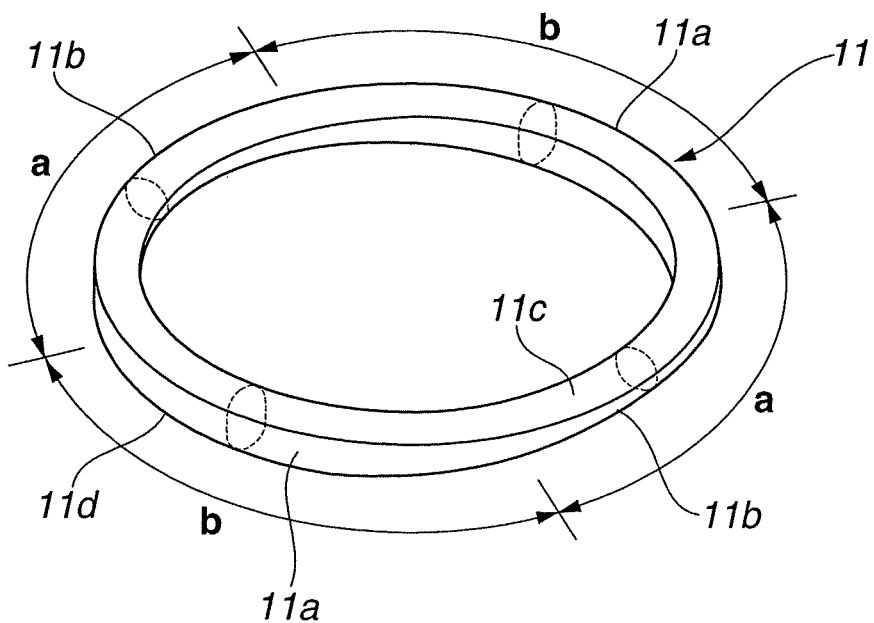
FIG. 6 is a projective view of a cooling channel formed in the piston according to the first embodiment.

Cooling channel 11 is not uniform in the cross sectional area in the circumferential direction as shown in FIGS. 5 and 6. Cooling channel 11 of this example includes a pair of main passage segments 11a, 11a and a pair of channel segments 11b, 11b. The main passage segments 11a, 11a are formed, respectively, in the apron forming regions a, a (the thick wall portions 2b, 2b) in which aprons 4, 4 are formed respectively. The channel segments 11b, 11b are formed, respectively, in the skirt forming regions b, b (the thin wall portions 2c, 2c) in which skirts 3, 3 are formed respectively. As shown in FIGS. 1, 2 and 6, the cross sectional shape of cooling channel 11 is elongated in the axial direction of piston 1 (up and down direction) in the shape of an elongated circle or oval, in each of the main passage segments 11a, 11a. On the other hand, the cross sectional shape of cooling channel 11 is formed in the shape of a circle or non-elongated circle, in each of the channel segments 11b, 11b, and thereby the cross sectional area of cooling channel 11 is made smaller in channel segments 11b, 11b than in main passage segments 11a, 11a. The width W (radial width) of each main passage segment 11a in the radial direction of the piston is substantially equal to the inside diameter W of each channel segment 11b.

Thus, each main passage segment 11a is elongated in the up and down direction in the corresponding one of thick wall portions 2b, 2b, and thereby enlarged in the cross sectional area. By contrast, each channel segment 11b is formed in the corresponding one of thin wall portions 2c, 2c, to have the cross sectional shape which is not elongated and not enlarged in this example, so that the cross sectional area of channel segments 11b, 11b is smaller than the cross sectional area of main passage segments 11a, 11a. Moreover, the radial width W of main channel segments 11a, 11a is substantially equal to the radial width (or the inside diameter) W of channel segments 11b, 11b. In this example, the main passage segments 11a, 11a are elongated in the piston axial direction but not elongated in the piston radial direction.

Figure 4:
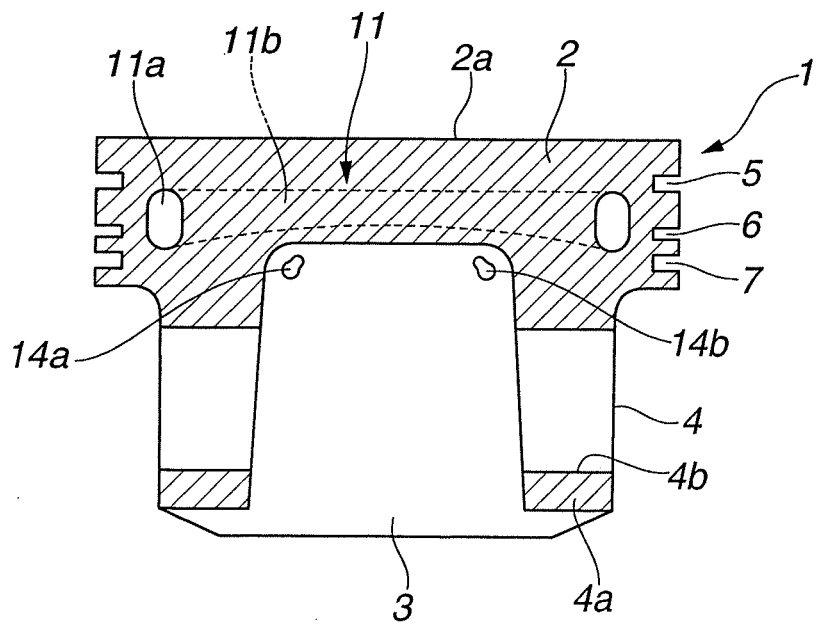
FIG. 4 is a vertical sectional view showing the piston according to the first embodiment.

As shown in FIGS. 1 and 4, each channel segment 11b is formed at an offset position spaced upwards from the wall surface of the corresponding thin wall portion 2c. In other words, the channel segments 11b, 11b are formed at the position or level higher than the position or level of main passage segments 11a, toward the crown surface 2a. An upper inside wall surface 11c of each channel segment 11b overlaps an upper inside wall surface of each main passage segment 11a in the circumferential direction. A lower inside wall surface 11d of each channel segment 11b is connected continuously with a lower inside wall surface 11e of each main passage segment 11a so that the cross sectional area is varied continuously and gradually between the channel segments 11b, 11b and the main passage segments 11a, 11a.

Therefore, the cooling oil introduced into cooling channel 11 from the oil introduction hole 12 can flow smoothly in cooling channel 11 and thereby cool the piston 1 efficiently.

A distance H between the lower inside wall surface 11d of each channel segment 11b and the upper inside side surface 7a of oil ring groove 7 is greater than or equal to 3 mm. In this example, the height H is approximately equal 3 mm. With the distance H set equal to or greater than 3 mm, it is possible to improve the flow of molten metal between oil ring groove 7 and channel segments 11b at the time of casting.

Drain hole or holes 14 are formed to connect the oil ring groove 7 and the piston inside space S. As shown in FIGS. 1 and 4, two drain holes 14a and 14b are opened radially by drilling in each of the (sectorial) skirt forming regions a, a.

Each of drain holes 14a and 14b is a small hole having a small diameter extending from the bottom of oil ring groove 7 to the inside wall surface of the thin wall portion 2c substantially in a horizontal direction. Each drain hole 14a or 14b extends substantially in a perpendicular direction perpendicular to the axis of the piston (substantially in the horizontal direction), so that a lower end 14c and an upper end 14d of the inside circumferential surface of the drain hole 14a or 14b extend longitudinally of the drain hole substantially in the horizontal direction, as shown in FIG. 1. The lower end 14c of the inside circumferential surface of each drain hole 14a or 14b is located at a position or level below the position or level of the upper inside surface 7b of the oil ring groove 7 whereas the upper end 14d of the inside circumferential surface of each drain hole 14a or 14b is located at a position lying approximately at the middle between the upper and lower side surfaces 7a and 7b of oil ring groove 7.

When the piston 1 slides up and down in a cylinder bore (not shown), the oil scraped by the oil ring 10 is collected in the oil ring groove 7 and discharged through the drain holes 14a and 14b into the inside space S.

In the thus-constructed piston 1 according to the first embodiment, the cooling oil is introduced from oil jet 13 through oil introduction hole 12 into cooling channel 11 during engine operation, and caused to flow in cooling channel 11 in the circumferential direction around the piston centerline. Therefore, the piston crown 2 and the other part of piston 1 can be cooled efficiently.

Cooling channel 11 according to this embodiment is made up of the two main passage segments 11a formed, respectively, in the apron forming regions or sectors "b" confronting each other diametrically across the piston centerline, and the two channel segments 11b formed, respectively, in the skirt forming regions or sectors "a" confronting each other diametrically across the piston centerline. Specifically, the channel segments 11b are reduced in the cross sectional size, so that it is possible to form the thin wall portion or portions 2c by recessing the inside surface toward the outside circumference of piston crown or removing the inside surface portion. Therefore, it is possible to form each of drain holes 14a and 14b by a drilling operation substantially in a perpendicular direction perpendicular to the piston centerline or a horizontal direction parallel to an imaginary transverse plane to which the piston centerline is perpendicular, without inclining the drilling direction too much. Consequently, the operation of forming the drain holes is made easier.

In the case of a piston of a comparative example of earlier technology, the whole of the inside circumference of the piston crown is thickened to a thick wall to form the cooling channel. Consequently, to form the drain holes, the drilling operation is required in an inclined direction sloping down at a relatively large inclination angle from the oil ring groove to the inside space of the piston to avoid the thick wall portion. Therefore, an operation of positioning a drilling tool is difficult, and the drilling operation is troublesome and low in working efficiency.

By contrast, with the cooling channel 11 according to this embodiment having the cross sectional shape not uniform in the circumferential direction, the drain holes can be opened in the thin wall portion or portions 2c. Therefore, it is possible to form the drain holes 14a and 14b in the drilling direction which is substantially horizontal without inclining the drilling tool too much. Therefore, the piston construction according to this embodiment can facilitate the operation of forming the drain holes, improve the efficiency of the drilling operation and reduce the manufacturing cost.

Moreover, the thin wall portions 2c function to reduce the weight of piston 1. Therefore, the inertia mass of piston 1 is reduced, and the sliding performance of piston 1 in the cylinder bore is improved.

The thin wall portions 2c function to reduce the rigidity of piston skirts 3. Therefore, it is possible to restrain piston noises or piston slapping noise against the cylinder bore inside surface due to inward deflection of the skirt especially on the thrust side during movement of piston 1 from the top dead center to the bottom dead center.

Figure 7:
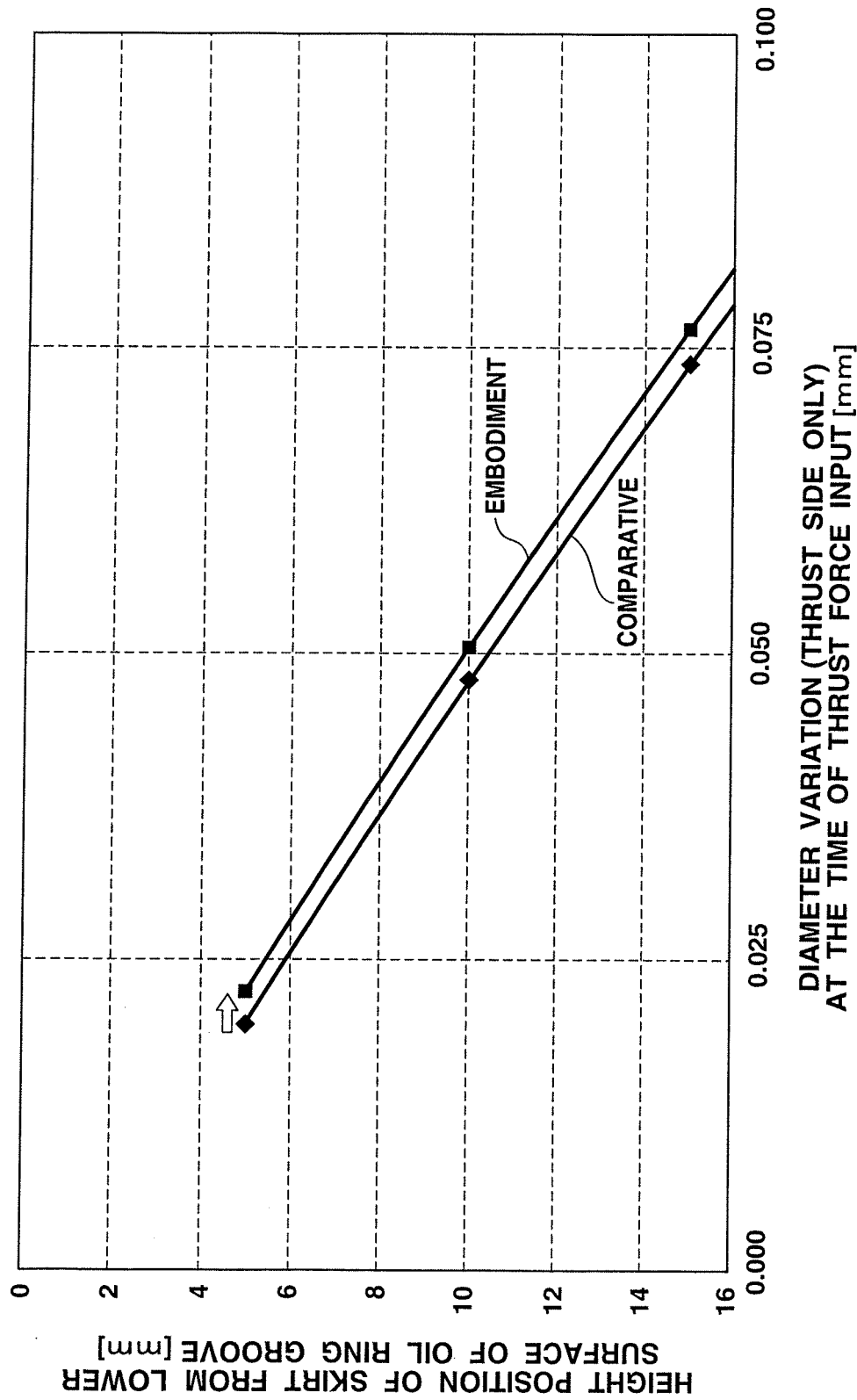
FIG. 7 is a graphic view showing flexural deformation of a skirt section of the piston according to the first embodiment, and the skirt section of the piston of a comparative example.

FIG. 7 is a graphic view showing experimental results verifying the deflection in the radial direction, of the thrust side skirt 3 abutting against the wall surface of the cylinder bore when the length or distance from the lower side surface 7b of oil ring groove 7 to the height position of the skirt 3 is varied. FIG. 7 shows the deflection or deflection quantity (rhombic points) of the skirt 3 of the piston according to this embodiment in comparison with the deflection (square points) of the skirt in the comparative example having no thin wall portions 2c. As shown in FIG. 7, the deflection of the skirt 3 is increased approximately by 10% as compared with the comparative example. This increase of deflection is considered to be result of the skirt rigidity decreased by the formation of the thin wall portions 2c. Thus, the piston according to this embodiment can reduce the piston noises efficiently as compared to the comparative example, as shown in FIG. 7

The main passage segments 11a and channel segments 3b of cooling channel 11 are connected continuously and smoothly so as to form a continuous passage extending circumferentially around the piston centerline. Therefore, the cooling channel 11 can convey the cooling oil smoothly and cool the piston crown 2 efficiently. Moreover, the cooling channel 11 having the non-uniform cross sectional size varying between the main passage segments 11a and the channel segments 11b activates the heat exchanging operation of the cooling oil in cooling channel 11, and improves the efficiency of cooling the piston crown 2.

Drain holes 14a and 14b are opened through the thin wall portions 2c, so that the lengths of the drain holes are decreased. Thus, the shortened drain holes can discharge the oil collected in oil ring groove 7, efficiently into the inside space S of the piston.

Second Embodiment

Figure 8:
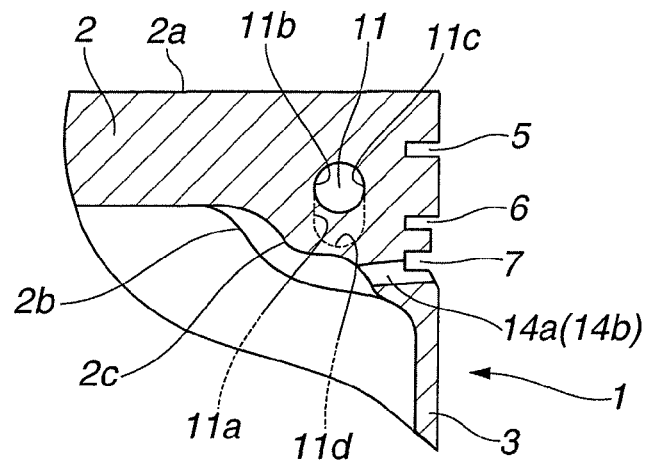
FIG. 8 is sectional view of a main portion of a piston according to a second embodiment.

FIG. 8 shows a part of a piston according to a second embodiment. The basic construction of the piston 1 according to the second embodiment is the same as that of the first embodiment. Unlike the first embodiment, in the second embodiment, each of the drain holes 14a and 14b is formed in a slightly inclined direction sloping down slightly from the oil ring groove 7 to the inside space S of the piston.

In this way, the longitudinal direction of each drain hole 14a or 14b is not necessarily horizontal. Each drain hole may be inclined slightly and formed in the inclined direction sloping down slightly toward the inside space S. Thus, it is possible to increase the flexibility or the degree of freedom of the drilling operation.

The piston according to the second embodiment is substantially identical to the piston of the first embodiment, in the other aspects including the structure of the cooling channel 11. Accordingly, the second embodiment can provide operations and effects similar to those of the first embodiment.

Further Embodiments

Figure 9:
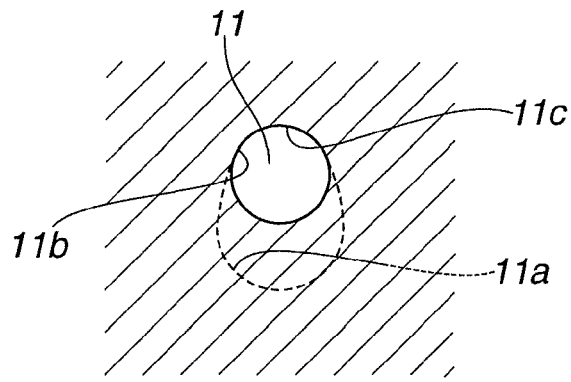
FIG. 9 is a sectional view showing a cooling channel in a first variation example according to the present invention.
Figure 10:
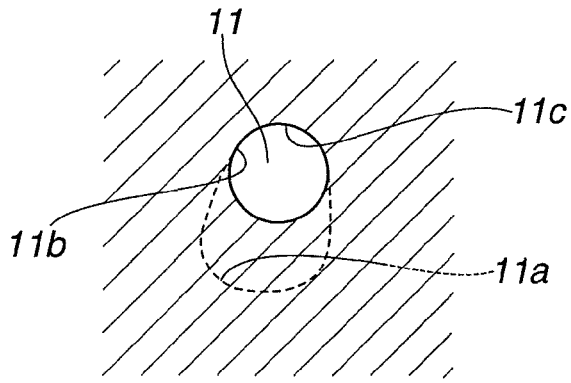
FIG. 10 a sectional view showing a cooling channel in a second variation example according to the present invention.
Figure 11:
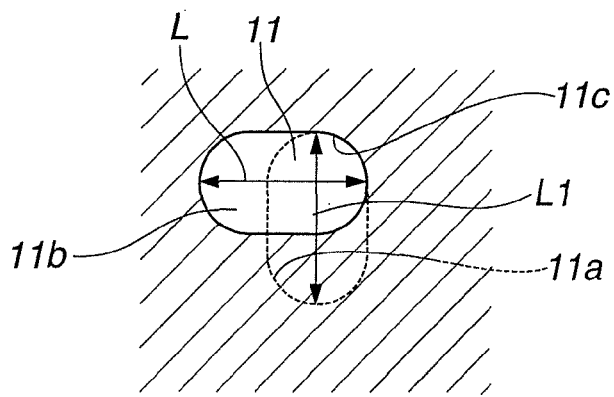
FIG. 11 a sectional view showing a cooling channel in a third variation example according to the present invention.

FIGS. 9~11 show variation examples according further embodiments of the present invention. In these variation examples, the cross sectional shapes of main passage segments 11a and channel segments 11b are changed.

In the cooling channel 11 shown in FIG. 9, the cross sectional shape of the channel segments 11b is the same as in the preceding embodiments, whereas the cross sectional shape of the main passage segments 11a is changed. As shown in FIG. 9, the main passage segment 11a is elongated downwards from the position of the channel segment 11b, and moreover enlarged laterally in the lower portion of the main passage segment 11a. Each of the main passage segments 11a includes the upper portion having the inside diameter or inside width substantially equaling that of the channel segments 11b and the lower portion enlarged laterally or radially to have the inside diameter or inside width greater than that of the channel segments 11b (on both of the radial outer side and the radial inner side). Therefore, the cooling channel 11 in the example of FIG. 9 can secure a sufficient amount of the flow of the cooling oil, and improve the heat exchanging efficiency.

In the cooling channel 11 shown in FIG. 10, the cross sectional shape of the channel segments 11b is the same as in the preceding embodiments, whereas the cross sectional shape of the main passage segments 11a is changed. As shown in FIG. 10, the main passage segment 11a is elongated downwards from the position of the channel segment 11b, and moreover enlarged inwardly in the lower portion of the main passage segment 11a. Each of the main passage segments 11a includes the upper portion having the inside diameter or inside width substantially equaling that of the channel segments 11b and the lower portion enlarged radially inwards to have the inside diameter or inside width greater than that of the channel segments 11b. Therefore, the cooling channel 11 in the example of FIG. 10, too, can secure a sufficient amount of the flow of the cooling oil, and improve the heat exchanging efficiency.

In the cooling channel 11 shown in FIG. 11, each of the main passage segments 11a is elongated downwards as in the first embodiment, whereas each of the channel segments 11b is elongated radially inwards. The height or axial position of channel segments 11b is equal to the height of main passage segments 11a, and the lateral length L of channel segments 11b is substantially equal to the vertical length L1 of main passage segments 11a. Accordingly, the cross sectional area of channel segments 11b is substantially equal to the cross sectional area of main passage segments 11a. In the other respects, the construction of this variation example is the same as the first embodiment.

Thus, the cooling channel 11 having no substantial change in the cross sectional size of the fluid passage between main passage segments 11a and channel segments 11b is capable of circulating a larger quantity of the cooling oil smoothly, and thereby improving the cooling performance.

The present invention is not limited to the preceding embodiments and examples. For example, the cross sectional shapes of main passage segments 11a and channel segments 11b of cooling channel 11 may be further modified in conformity with the cross sectional shapes of thick and thin wall portions 2b and 2c. Moreover, the present invention is applicable to internal combustion engines of various types such as straight or inline engines, V type engines and horizontally-opposed cylinder or flat engines.

According to the embodiments and variations of the present invention, it is possible to derive following technical concepts or ideas.

According to a technical concept "a", the drain hole extends in a direction substantially perpendicular to a piston axial line, from a bottom surface of the oil ring groove to the inside space of the piston, and the crown includes a thinned portion (having a reduced wall thickness) in which the drain hole is opened to the inside space. This piston construction can facilitate the operation of opening the drain hole(s), and improve the performance of discharging the oil from the oil ring groove to the piston inside space by decreasing the length of the drain hole with the thinned portion or thin wall portion. Moreover, the thinned portion functions to reduce the weight of the piston, decrease the rigidity of the skirt section and thereby reduce the piston noises.

According to a technical concept "b", the channel segment is formed in a region or sector in which the skirt section is formed.

According to a technical concept "c", the channel segment is formed in each of first and second regions, the first region or sector being a region in which a first piston skirt on a thrust side is formed, the second region or sector being a region in which a second piston skirt on an anti-thrust side is formed.

According to a technical concept "d", the cooling channel includes the channel segment and a main passage segment connected with the channel segment to form a circumferentially extending fluid passage; the channel segment has a cross sectional shape different from a cross sectional shape of the main passage segment; and an inside circumferential surface of the channel segment is connected smoothly and continuously with an inside circumferential surface of the main passage segment. Therefore, the piston construction according to the invention can provide effect of stirring the cooling oil with the different cross sectional shapes of the channel segment and the main passage segment, and thereby activate the heat exchanging operation.

According to a technical concept "e", a cross sectional area of the channel segment is substantially equal to a cross sectional area of the main passage segment.

According to a technical concept "f", the drain hole extends in a direction slightly inclined with respect to a direction perpendicular to a piston axis. Therefore, the drain hole can be opened with a small inclination angle within a range not affecting the machining operation largely, according to the need for layout.

According to a technical concept "g", the oil ring groove is defined by upper and lower side wall surfaces confronting each other in an axial direction of the piston, and a bottom wall surface connecting the upper and lower side surfaces to form an approximately rectangular sectional shape; and the drain hole extends substantially in parallel to the upper and lower side surfaces.

According to a technical concept "h", the channel segment is deviated toward the crown surface in an axial direction of the piston.

According to a technical concept "i", the cooling channel includes a main passage segment and the channel segment which is connected with the main passage segment (to form a continuous annular passage or a circumferentially extending continuous passage) and which has a cross sectional area substantially equal to a cross sectional area of the main passage segment; and the channel segment is deviated toward the crown surface in an axial direction of the piston. The cooling channel having no substantial change in the cross section size can cause a sufficient amount of the cooling oil to flow smoothly.

According to a technical concept "j", an uppermost portion (11c) of the inside circumferential surface of the channel segment is located at a height substantially equal to a height of an uppermost portion of the main passage section. For example, a (vertical or axial) distance from an imaginary transverse plane which is located at the level of the crown surface (2a) and which is a plane to which the piston center line is perpendicular, to (the uppermost portion of) the channel segment (11b, 11b) is substantially equal to a (vertical or axial) distance from the imaginary transverse plane at the level of the crown surface (2a), to (the uppermost portion of) the main passage segment (11a, 11a).

According to a technical concept "k", a width in a direction perpendicular to the piston axis, of the channel segment is substantially equal to a width in the direction perpendicular to the piston axis, of the main passage segment.

According to a technical concept "l", a width in a direction perpendicular to the piston axis, of the channel segment is greater than a width in the direction perpendicular to the piston axis, of the main passage segment.

According to a technical concept "m", a cross sectional area of the channel segment is smaller than a cross sectional area of the main passage segment.

According to a technical concept "n", the main passage segment has an elongated cross sectional shape elongated in a piston axial direction.

According to a technical concept "o", a width in a direction perpendicular to the piston axis, of the channel segment is greater than a width in the direction perpendicular to the piston axis, of the main passage segment.

According to a technical concept "p", a length in a piston axial direction, of the channel segment is smaller than a length in the piston axial direction, of the main passage segment.

According to one aspect of the illustrated embodiments of the present invention, a piston comprises: a crown or head including a crown or top surface; a skirt section extending downwards from the crown; and an oil ring groove. The piston further comprises a drain hole and a cooling channel. The drain hole extends from the oil ring groove to an inside space of the piston. The cooling channel is formed in the crown to circulate a coolant (around a piston centerline or piston axis). The cooling channel includes a main passage segment and a channel segment connected with the main passage segment to form an annular or circumferential passage, and located above the drain hole (toward the crown surface). The main passage segment is elongated in a downward direction away from the crown surface whereas the channel segment is not elongated in the downward direction.

As explained above, according to another aspect of the illustrated embodiments, a piston comprises: a crown or head including a crown or top surface; a skirt section extending downwards from the crown; and an oil ring groove. The piston further comprises a drain hole and a cooling channel. The drain hole extends from the oil ring groove to an inside space of the piston to discharge a lubricating oil from the oil ring groove to the inside space. The cooling channel is a circumferentially extending fluid passage or annular fluid passage formed in the crown at a level or height between the crown surface and the oil ring groove, and arranged to covey a cooling oil to cool the crown. In the illustrated examples, the piston crown (2) includes a top wall including the crown surface (2a), and a circumferential wall formed with a ring belt including the oil ring groove (7). The circumferential wall includes an annular inside wall portion separating the oil ring groove and the inside space from each other and including a thick wall portion and a thin wall portion. The drain hole is formed in the thin wall portion. The cooling channel includes a main passage segment formed in the thick wall portion and a channel segment formed in the thin wall portion, and shaped to have a vertical length smaller than a vertical length of the main passage segment.

In the illustrated examples, the piston crown (2) includes a top wall including the crown surface (2a), an outer circumferential wall formed with a ring belt including an oil ring groove (7) and an inside (reentrant) corner portion (2b, 2c) including an inside surface bounding the inside space (S). The inside corner portion (2b, 2c) is formed between the top wall and the outer circumferential wall of the piston. The inside corner portion bulges into the inside space (S) of the piston. The inside corner portion (2b, 2c) is formed with (at least a part of) the cooling channel. The inside corner portion includes a thin wall portion or thinned portion (2c) recessed in a radial outward direction toward the oil ring groove (7) and formed with the drain hole. The thin wall portion (2c) may be recessed in an upward direction toward the crown surface (2a) as well as in the radial outward direction from the inside surface of the remaining part (2b) of the inside corner portion. The drain hole is formed in the thin wall portion. The cooling channel includes a main passage segment formed in the thick wall portion and a channel segment formed in the thin wall portion. Preferably, the main passage segment extends downwards from a predetermined higher position to a first lower position, and the channel segment extends downwards from the predetermined higher position to a second lower position higher than the first lower position.

The drain hole extends in a horizontal direction which is a direction substantially parallel to an imaginary transverse plane which is a plane to which the piston center line is perpendicular, or in a slightly inclined direction sloping down slightly from the oil ring groove to the inside space.

This application is based on a prior Japanese Patent Application No. 2013-58883 filed on Mar. 21, 2013. The entire contents of this Japanese Patent Application are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A piston for an internal combustion engine, the piston comprising:
    a crown including a crown surface;
    a skirt section extending from an outside circumference of the crown;
    an oil ring groove formed in an outside circumference of the crown;
    a drain hole extending through a bottom wall of the oil ring groove and connecting the oil ring groove with an inside space of the piston, the drain hole being structurally configured to at least discharge oil away from the crown; and
    a cooling channel formed, in a shape of a circular ring, in the crown at a position between the crown surface and the oil ring groove, and arranged to convey a cooling oil;
    the cooling channel including a channel segment located near the drain hole and a main passage segment connected with the channel segment to form a circumferentially extending continuous fluid passage, the channel segment being formed to have a cross sectional shape which is offset from a cross sectional shape of the main passage segment and which is shaped to avoid the drain hole.

2. The piston as recited in claim 1, wherein the drain hole extends in a direction substantially perpendicular to a piston axial line, from a bottom surface of the oil ring groove to the inside space of the piston, and the crown includes a thinned portion in which the drain hole is opened to the inside space.

3. The piston as recited in claim 2, wherein the channel segment is formed in a region in which the skirt section is formed.

4. The piston as recited in claim 1, wherein the channel segment is formed in each of first and second regions, the first region being a region in which a first piston skirt on a thrust side is formed, the second region being a region in which a second piston skirt on an anti-thrust side is formed, the first and second piston skirts being portions included in the skirt section.

5. The piston as recited in claim 1, wherein an inside circumferential surface of the channel segment is connected smoothly with an inside circumferential surface of the main passage segment.

6. The piston as recited in claim 5, wherein a cross sectional area of the channel segment is substantially equal to a cross sectional area of the main passage segment.

7. The piston as recited in claim 6, wherein a width in a direction perpendicular to the piston axis, of the channel segment is greater than a width in the direction perpendicular to the piston axis, of the main passage segment.

8. The piston as recited in claim 6, wherein a length in a piston axial direction, of the channel segment is smaller than a length in the piston axial direction, of the main passage segment.

9. The piston as recited in claim 5, wherein an uppermost portion of the inside circumferential surface of the channel segment is located at a height substantially equal to a height of an uppermost portion of the main passage segment.

10. The piston as recited in claim 9, wherein a width in a direction perpendicular to the piston axis, of the channel segment is substantially equal to a width in the direction perpendicular to the piston axis, of the main passage segment.

11. The piston as recited in claim 9, wherein a width in a direction perpendicular to the piston axis, of the channel segment is greater than a width in the direction perpendicular to the piston axis, of the main passage segment.

12. The piston as recited in claim 5, wherein a cross sectional area of the channel segment is smaller than a cross sectional area of the main passage segment.

13. The piston as recited in claim 12, wherein the main passage segment has an elongated cross sectional shape elongated in a piston axial direction.

14. The piston as recited in claim 1, wherein the drain hole extends in a direction slightly inclined with respect to a direction perpendicular to a piston axis.

15. The piston as recited in claim 1, wherein the oil ring groove is defined by upper and lower side wall surfaces confronting each other in an axial direction of the piston, and a bottom wall surface connecting the upper and lower side surfaces to form an approximately rectangular cross sectional shape; and the drain hole extends substantially in parallel to the upper and lower side surfaces.

16. The piston as recited in claim 1, wherein the channel segment is deviated toward the crown surface in an axial direction of the piston.

17. The piston as recited in claim 1, wherein the cooling channel includes a main passage segment and the channel segment which is connected with the main passage segment and which has a cross sectional area substantially equal to a cross sectional area of the main passage segment; and the channel segment is deviated toward the crown surface in an axial direction of the piston.

18. A piston for an internal combustion engine, the piston comprising:
- a crown including a crown surface;
- a skirt section extending from an outside circumference of the crown;
- an oil ring groove formed in an outside circumference of the crown;
- a drain hole extending through a bottom wall of the oil ring groove and connecting the oil ring groove with an inside space of the piston, the drain hole being structurally configured to at least discharge oil away from the crown; and
- a cooling channel formed, in a shape of a circular ring having offset cross-sectional shapes, in the crown at a position between the crown surface and the oil ring groove, and arranged to convey a cooling oil;
- the cooling channel including a channel segment located near the drain hole and a main passage segment connected with the channel segment to form a circumferentially extending continuous fluid passage, the channel segment extending from an upper end to a lower end in a downward direction away from the crown surface, the lower end of the channel segment being offset in an upward direction toward the crown surface to avoid the drain hole, above a lower end of the main passage segment.

19. The piston as recited in claim 18, wherein a distance of the channel segment from an upper side surface of the oil ring groove is equal to or greater than approximately 3 mm, the upper side surface of the oil ring groove facing in the downward direction away from the crown surface toward a lower side surface defining the oil ring groove between the upper and lower side surfaces.

20. A piston for an internal combustion engine, the piston comprising:
- a crown including a crown surface;
- a skirt section including a pair of piston skirts extending downwards from an outside circumference of the crown;
- an oil ring groove formed in an outside circumference of the crown;
- a drain hole extending through a bottom wall of the oil ring groove and connecting the oil ring groove with an inside space of the piston; and
- an annular cooling channel formed in the crown, at a level above the oil ring groove, and arranged to convey to cooling oil;
- the cooling channel including two of the channel segments extending circumferentially, respectively, in two skirt forming regions in which the piston skirts are formed respectively, and two main passage segments extending circumferentially, respectively, in two apron forming regions each of which is located circumferentially between the skirt forming regions;
- the channel segments and the main passage segments having offset cross-sectional shapes and being arranged alternately in a circle and connected end to end to form a single continuous annular passage composed of the channel segments and the main passage segments;
- each of the main passage segments being elongated downwards away from the crown surface beyond a predetermined level whereas each of the channel segments is formed only above the predetermined level without being elongated downwards beyond the predetermined level; and
- the drain hole extending from the oil ring groove to the inside space of the piston without interference with the cooling channel.

* * * * *